March 25, 1924.                              1,488,204
H. JERVIS
VEHICLE BRAKE
Filed Nov. 6, 1922
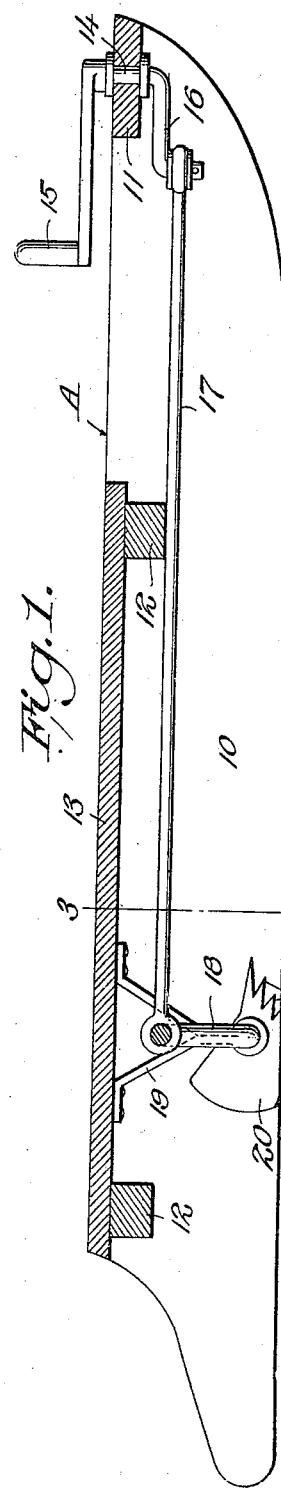
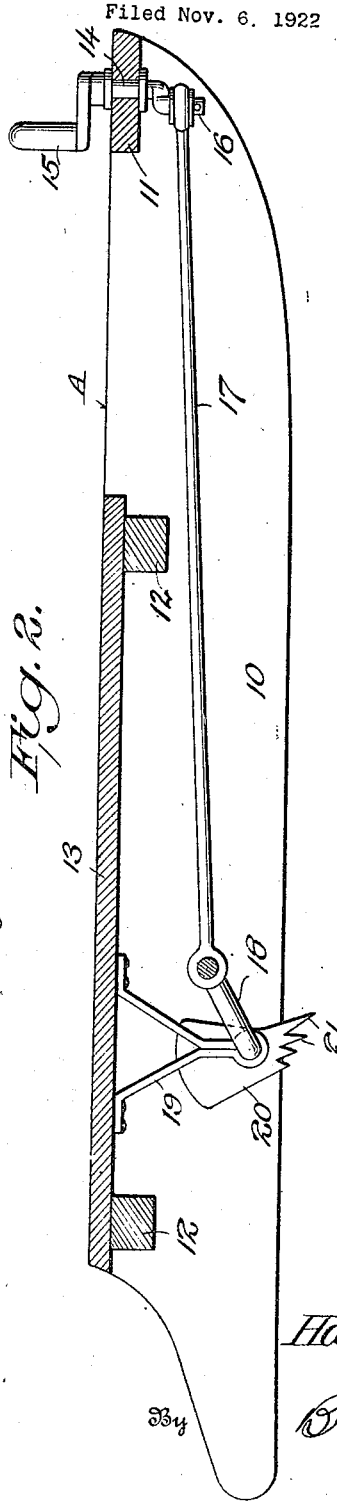
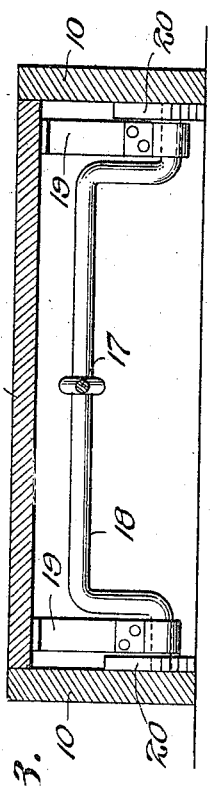
Inventor
Harry Jervis,
By Bright & Bailey
Attorneys Patented Mar. 25, 1924.

1,488,204

UNITED STATES PATENT OFFICE.

HARRY JERVIS, OF WEIRTON, WEST VIRGINIA.

VEHICLE BRAKE.

Application filed November 6, 1922. Serial No. 599,343.

*To all whom it may concern:*

Be it known that I, HARRY JERVIS, a citizen of the United States, and resident of Weirton, in the county of Hancock and State of West Virginia, have invented certain new and useful Improvements in Vehicle Brakes, of which the following is a specification.

My invention relates to vehicle brakes of the type adapted to make direct contact with the surface over which a vehicle may be travelling, whereby to control the speed of the latter, and it is more particularly my purpose to provide a brake device of this character which may be applied progressively with varying amounts of intensity to retard gradually or completely halt the movement of a vehicle, such as a sled, irrespective of the degree of inclination of the slope over which it may be travelling, and irrespective of the condition of the surface of such slope, whether it be hard snow or ice or merely relatively soft slush.

In addition to the foregoing, it is my further purpose to provide a brake device of the type mentioned which is extremely simple in construction, cheap to produce, readily and easily applied to various types of sleds without alteration thereto, and which is thoroughly reliable and efficient in operation.

With the foregoing and other purposes in view, my invention consists in the novel features of construction, combination and relative arrangement of parts as will be hereinafter more fully described, illustrated in the accompanying drawings, and particularly defined in the appended claim.

In the drawings wherein like characters of reference denote corresponding parts in the different views—

Figure 1 is a longitudinal section of a sled showing my improved brake device applied thereto and disposed in inoperative position;

Figure 2, a view similar to Figure 1 showing an operative position of my improved braking device;

Figure 3, a transverse section on the line 3—3 of Figure 1.

My improved brake device is adapted to be applied to vehicles of various types, but is particularly applicable to sleds for effectively controlling their movements over different kinds of surfaces, to which end it includes an element or elements for direct surface engagement operable in a progressively increasing or diminishing manner to obtain more or less surface penetration and consequently more or less braking action as may be desired in particular instances.

In the present instance my improved brake device is shown associated with a sled A of usual construction embodying essentially runners 10, 10 forwardly connected by a cross bar 11 and intermediately connected by braces 12 which support the rider's seat or platform 13.

In applying my braking device to the sled A I mount a vertical shaft 14 in the cross bar 11 and provide on the upper end of the same a handle 15 which extends in convenient reach of the occupant of the seat or platform 13 whereby said shaft may be rotated. The lower end of this shaft is provided with a crank 16 and by means of a rod 17 I connect said crank with the intermediate portion of an inverted U-shaped yoke 18, located preferably near the rear of the sled and extending transversely across the same beneath the seat 13 and between the runners 10, 10 as shown. The end portions of the yoke 18 are rotatably mounted, respectively, in brackets 19, 19 depending from the seat 13 and upon the terminals of said end portions are fixed in any suitable manner surface penetrating devices 20, 20 for obtaining desired braking effects upon manipulation of the handle 15 to swing said yoke and consequently rotate said devices in a manner which is apparent.

The devices 20, 20 consist of plates having peripheral teeth 21 formed thereon which teeth it will be noted are of progressively varying length and have their apexes disposed progressively varying distances from the axis of the yoke end portions upon which the plates are mounted, so that when the yoke is swung by means of the handle 15 to rotate said end portions, the plates also will be rotated and the toothed portions thereof swung below or above the bottoms of the runners 10, 10 as the case may be, depending upon whether it is intended to retard or permit acceleration of the speed of the sled.

In the normal relation of the parts mentioned as shown in Figure 1 the crank 16 is disposed rearwardly and the yoke 18 vertically, while in the present instance the handle 15 also is disposed rearwardly, but its angularity with respect to the crank manifestly may be varied as desired. With the yoke disposed vertically the lower edges of the plates 20, 20 are disposed substantially in the same plane and parallel with the lower edges of the runners 10, 10, while the teeth 21 extend forwardly with the shorter of the same disposed lowermost next to the bottoms of the runners from where they progressively increase in length upwardly as shown. Thus it is apparent that when the yoke is swung forward by means of the handle 15, first the shorter tooth and then the longer teeth will be projected below the bottoms of the runners and into the surface over which the sled is travelling, whereby its speed may be controlled, it being understood, of course, that the greater penetration of the longer teeth gives an increased braking action over the lesser penetration of the shorter teeth, and that the desired braking effect is obtained by varying the swing of the yoke by means of the operation handle 15. Thus the speed of the sled may be slackened or the sled brought to a complete stop in a smooth even manner irrespective of the condition of the surface over which it is travelling whether it be hard or soft snow or ice, or merely slush, and furthermore, due to locating the plates 20 one adjacent to each side of the sled, any tendency of the latter to turn in its tracks when being stopped is eliminated.

I claim:—

The combination with a sled including runners connected by a cross bar and having a rider's platform, of brackets secured to said platform, an inverted U-shaped yoke mounted in said brackets, a pair of plates fixed respectively to the terminal ends of said yoke, one of said plates being disposed adjacent to each runner, peripheral teeth formed on said plates for direct penetration into the surface over which the sled may be travelling; said teeth being progressively varied in length and having their apexes disposed progressively varying distances from the axis of rotation of said plates, a vertical shaft mounted in said cross bar, a handle for rotating said shaft, a crank thereon, and a rod connecting said crank with an intermediate portion of said yoke.

In testimony whereof I hereunto affix my signature.

HARRY JERVIS.